Figure 1:
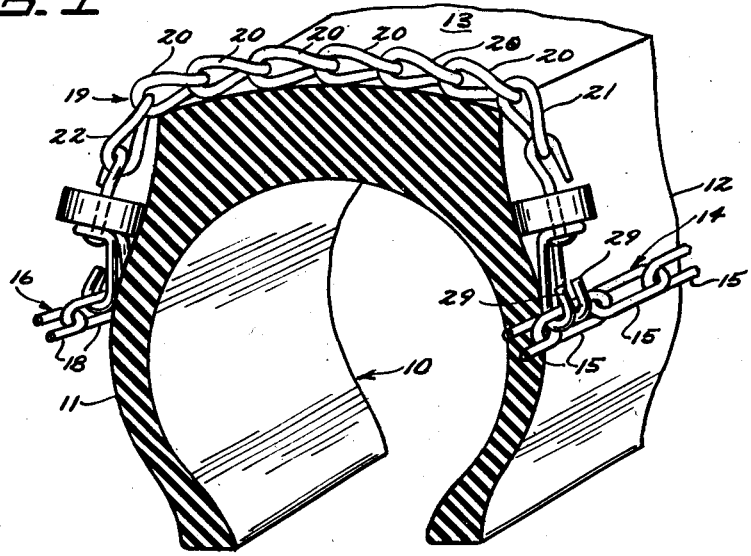

Sept 17, 1957 W. B. THOMAS 2,806,504
RESILIENT CONNECTION FOR TIRE CROSS-CHAINS
Filed May 24, 1954

INVENTOR.
WENDELL B. THOMAS
BY
ATTORNEYS

United States Patent Office 2,806,504
Patented Sept. 17, 1957

2,806,504

RESILIENT CONNECTION FOR TIRE CROSS-CHAINS

Wendell B. Thomas, Minneapolis, Minn.

Application May 24, 1954, Serial No. 431,767

5 Claims. (Cl. 152—239)

This invention relates to new and useful improvements in resilient connections and more particularly to new and useful improvements in swivel connections for joining the cross members of anti-skid motor vehicle tire chains to the side members of the chains.

In the use of motor vehicle tire chains for anti-skid protection and providing traction, there has always been the problem of providing a cross chain member suitably connected to the side chain members so that the cross chain is adapted to swivel relative to the side chain members for providing a longer life for the cross chains and smoother and more uniform traction. There has also remained the problem of providing a connection for a cross chain member whereby the cross chain member may be readily replaced as it is broken or worn out, and whereby a cushion is provided for such connection.

It is therefore an object of this invention to provide a new and useful swivel connection particularly for attaching the ends of the cross chain members for motor vehicle tire chain members to side chain members and the like.

It is also an object of this invention to provide a motor vehicle tire chain having cross chain members which are adapted to swivel relative to the side or carrier chains.

It is a further object of this invention to provide a motor vehicle tire chain having cross chain members which are readily removable or replaceable.

It is a further object of this invention to provide a new and useful resilient connection particularly for attaching the ends of cross chain members to side chain members and the like.

It is also an object of this invention to provide a swivel connection between a cross chain member of a motor vehicle chain and a side or carrier chain member having a resilient means for positioning the end links of said cross chain member to said swivel connection.

Another object of this present invention resides in the provision of a resilient roller for a swivel connection for connecting cross chain members to side chain members of motor vehicle tire chains, said resilient roller serving to engage the side walls of the tire and also serving as a means for keeping the end links of said cross chain member secured to said swivel connection.

It is a further object of the present invention to provide a motor vehicle tire chain having a swivel connection between the cross chain members and the side chain members, and a resilient means allowing ready removal and ready replacement of the cross chain members.

It is also a further object of this invention to provide a motor vehicle tire chain having a swivel connection between the cross chain members and the side or carrier chain members and in which means is provided for resiliently positioning the swivel connection with reference to the side walls of the tire.

It is a further object of this invention to provide a new and useful tire chain for motor vehicles in which the noise produced by the chains is materially decreased.

Other and further objects reside in my provision of a resilient roller in combination with a swivel connection, the resilient roller serving as a keeper for keeping the link of predetermined diameter upon the hook of such swivel connection and also serving for positioning of the swivel connection with reference to the side wall of a motor vehicle tire.

Other and further objects of this invention are those apparent and inherent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Figure 2:
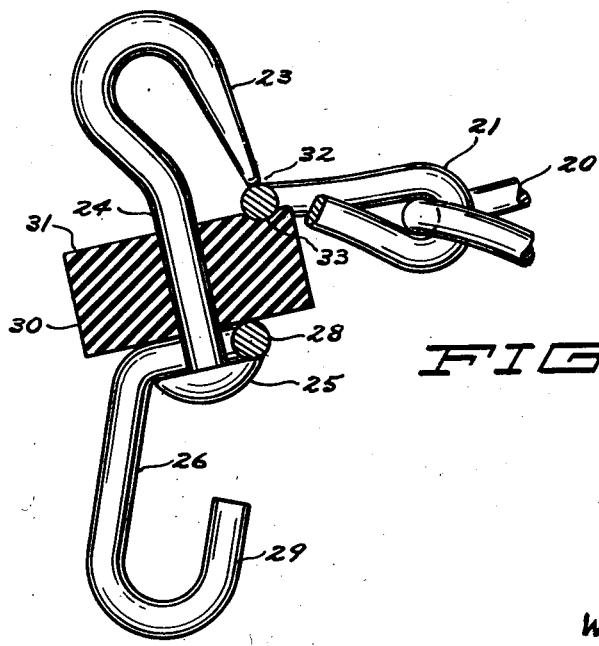

This invention will be described with reference to the drawings in which corresponding numerals refer to the same parts and in which:

Figure 1 is an isometric view of a section of an automobile tire showing two swivel connections of my invention joining a cross chain member to the side or carrier chains of the tire; and Figure 2 is a vertical sectional view through my swivel connection and showing the end link of a cross chain member being removed therefrom or inserted thereon.

This invention will be described particularly with reference to its use for connecting the cross chain members of a motor vehicle tire chain to the side chain or carrier members thereof. However, my connection of this invention may be used in a variety of other situations and it is to be understood that I do not limit myself specifically to its use in cooperation with motor vehicle tire chains. Thus, it may be used in any situation wherein a member having a link of predetermined diameter is to be connected to a hook by being positioned thereon, particularly when the hook is to be cushioned from or is to be swiveled to adjacent members or structure.

Referring now to the drawings, there is shown a section of a motor vehicle tire, generally designated 10, having side wall portions 11 and 12 and a tread portion 13. Positioned on the tire in conventional manner is an anti-skid tire chain comprising side or carrier chains generally designated 14, having a plurality of links 15 and a similar side or carrier chain generally designated 16 having a plurality of links 18.

While only a section of a motor vehicle tire or casing is shown and only several links of the side or carrier chains 14 and 16 are shown, this is illustrative of an entire tire having carrier chains positioned in abutment with each side wall thereof and a plurality of cross chains secured thereto in well known conventional manner.

A cross chain member 19, provided with a plurality of tread engaging links 20 and a pair of end links 21 and 22, is positioned across the tread surface 13 of the tire. Connected to each one of the end links 21 and 22, as shown for link 21 in Figure 2, is a swivel hook 23 of the configuration best shown in Figure 2 having a shank 24 and a rounded head 25 secured thereto. A link element 26 having an eye 28 at one end and parallel hook 29 at the other is positioned so that the eye 28 engages the head 25 and surrounds shank 24 and parallel hooks 29 engage one of the links (15 or 18) of the cross chain. The ends of the hooks 29, after engagement with the carrier or side chain links, are bent inwardly as shown in Figure 1.

Positioned on the shank 24 of the swivel hook 23 is a resilient member 30 which, in the preferred embodiment, is a rubber washer. However, it is to be understood that other resilient materials such as synthetic resinous materials may be utilized without departing from the spirit and scope of this invention. The axial dimension of the rubber washer or roller 30 is such that the distance between the edge 31 of the washer or roller and the end 32 of the hook 23 is slightly less than the diameter of the link 21 of the cross chain which is being positioned on the hook 23. Thus, the resilient rubber washer will be deformed as at 33 to permit the link 21 to be positioned thereon or removed therefrom, as shown in Figure 2.

Thus, as will be seen with reference to Figure 2, the rubber washers 30 serve to engage the sides 11 and 12 of the vehicle tire and permit a certain amount of adjustment of members 23 and 26 relative to the perpendicular with reference to Figure 1. The rubber rollers also serve as keepers to maintain the links 21 in position on hooks 32.

As many widely differing embodiments of this invention may be made without departing from the spirit and scope thereof, it is to be understood that I do not specifically limit myself to the embodiment disclosed herein.

What I claim is:

1. The subcombination comprising a swivel connection including a hook upon which a link is adapted to be positioned, a resilient compressible roller positioned around the shank of said hook and providing a resilient edge spaced from the end of said hook, said roller having an axial dimension such that the space between the edge thereof and the end of said hook is slightly less than the diameter of the link adapted to be positioned on said hook.

2. The subcombination comprising a connection including a hook upon which a link is adapted to be positioned, a resilient compressible member positioned around the shank of said hook and providing a resilient edge spaced from the end of said hook, said member having an axial dimension such that the space between the edge thereof and the end of said hook is slightly less than the diameter of the link adapted to be positioned on said hook.

3. A tire chain including a pair of side chains and a cross chain, a swivel connection securing each of the end links of said cross chain to said side chains, said swivel connection including a hook having a shank, a resilient compressible roller positioned on said shank and having a surface engaging said shank and a surface for engaging the wall of a tire with which said chain is to be used, and having end surfaces, one of which is spaced away from the end of said hook, the end of said shank having a retaining flange, a link element having an eye positioned around said shank, and retained by said flange, the other of said end surfaces engaging said eye, the axial dimension of said roller being such that the space between said surface spaced from the end of said hook and the end of said hook is slightly less than the diameter of the link of the cross chain being secured thereto.

4. A tire chain including a pair of side chains and a cross chain, swivel connection means securing end links of said cross chain to said side chains, a roller consisting of a resilient compressible material bracing each of said swivel connections from a side wall of the vehicle tire and providing a retaining means for retaining said end links in position on said swivel connections, said swivel connections including a hook having a shank and said resilient roller positioned on said shank and spaced away from the end of said hook; the axial dimension of said resilient roller being such that the space between the edge thereof and the end of said hook is slightly less than the diameter of the link of the cross chain being secured thereto.

5. In a tire chain including a pair of side chains, and a cross member secured thereto by swivel connections, the improvement comprising said swivel connections including a hook, a roller of a compressible material positioned on the hook and spacing the same from the side wall of the tire, said roller serving as a keeping means for retaining said cross chain thereon.

References Cited in the file of this patent

UNITED STATES PATENTS

| 1,817,547 | Eddy | Aug. 4, 1931 |
| 2,415,583 | Eddy | Feb. 11, 1947 |
| 2,617,464 | Trumbull | Nov. 11, 1952 |

FOREIGN PATENTS

| 12,882 | Australia | May 31, 1933 |